US012561675B2

(12) United States Patent
Modadugu et al.

(10) Patent No.: US 12,561,675 B2
(45) Date of Patent: Feb. 24, 2026

(54) RELATIONSHIP VERIFICATION WITH DIGITAL IDENTITY

(71) Applicant: American Express Travel Related Services Company, Inc., New York, NY (US)

(72) Inventors: Rajendra Prasad Modadugu, Weston, FL (US); Jyothsna Nayak, Weston, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 109 days.

(21) Appl. No.: 18/399,884

(22) Filed: Dec. 29, 2023

(65) Prior Publication Data

US 2025/0217795 A1 Jul. 3, 2025

(51) Int. Cl.
G06Q 20/38 (2012.01)
G06Q 20/10 (2012.01)
G06Q 20/40 (2012.01)

(52) U.S. Cl.
CPC ......... G06Q 20/3821 (2013.01); G06Q 20/10 (2013.01); G06Q 20/401 (2013.01); G06Q 2220/00 (2013.01)

(58) Field of Classification Search
None
See application file for complete search history.

(56) References Cited

U.S. PATENT DOCUMENTS

| | | | | |
|---|---|---|---|---|
| 12,229,761 B1 * | 2/2025 | Ferenczi | ............ | G06Q 20/4014 |
| 12,299,685 B2 * | 5/2025 | Ratnakaram | ....... | G06Q 20/4014 |
| 12,417,455 B2 * | 9/2025 | Kel | ...................... | G06Q 20/382 |
| 2012/0158539 A1 * | 6/2012 | Lawrence | .......... | G06Q 30/0643 |
| | | | | 705/26.8 |
| 2013/0097233 A1 * | 4/2013 | Raman | ................... | G06Q 50/01 |
| | | | | 709/204 |
| 2020/0184449 A1 * | 6/2020 | Melgar | .................. | G06Q 20/10 |
| 2021/0049682 A1 * | 2/2021 | Roselli | ................... | G06Q 40/02 |
| 2022/0036356 A1 * | 2/2022 | Praszczalek | ............ | G06F 21/45 |
| 2023/0080249 A1 * | 3/2023 | Prendergast | ....... | G06Q 20/4037 |
| | | | | 705/75 |
| 2025/0217806 A1 * | 7/2025 | Edupuganti | .......... | G06Q 20/405 |

* cited by examiner

*Primary Examiner* — Jamie R Kucab
(74) *Attorney, Agent, or Firm* — Thomas Horstemeyer, LLP

(57) ABSTRACT

Disclosed are various embodiments for relationship verification using digital identities. A computing device can receive a request to link a first user profile with a second user profile, the request including at least a first user decentralized identifier (first user DID) associated with the first user profile and a second user decentralized identifier (second user DID) associated with the second user profile. Next, the computing device can obtain a verifiable credential (VC) claiming a relationship between the first user DID and the second user DID and verify the relationship between the first user DID and the second user DID based at least in part on the VC. Then, the computing device can link the first user profile and the second user profile.

18 Claims, 5 Drawing Sheets

166

300   Determine Profile Balances

303   Generate Linked Balance

306   Receive Transfer Request

309   Receive Allocation Instruction

313   Obtain Approval

316   Transfer Amount

RELATIONSHIP VERIFICATION WITH DIGITAL IDENTITY

BACKGROUND

Decentralized Identifiers (DIDs) are globally unique identifiers that enable individuals, organizations, or devices (holders) to have verifiable and self-owned digital identities. Verifiable credentials (VCs) are data structures generated by issuers that represent claims about some attribute, qualification, or achievement of a holder. A holder can generate a verifiable presentation (VP) from VCs, and the VP can be presented to a verifier for verification of the authenticity and origin of the claim regarding the attribute, qualification, or achievement of the holder.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for relationship verification and linking with digital identities. In many circumstances, users may wish to link one or more accounts with an institution to gain additional benefits. For example, a rewards member may have multiple rewards accounts with an institution through various program enrollments and may wish to combine the rewards balances of each of the respective rewards accounts in order to redeem a larger amount of the rewards at one time. In another example, a credit card holder may wish to combine the spending power or credit limit of his credit account with that of his spouse's credit account with the same institution in order to make a large purchase. However, security and authenticity concerns arise when linking accounts across users.

Accordingly, various embodiments of the present disclosure provide for the use of decentralized identifiers (DIDs), verifiable credentials (VCs), and a public blockchain network to make verifiable relationships between various accounts or user profiles. The use of digital identity and a blockchain network allows for various institutions to issue and verify claims regarding the relationship(s) between two or more individuals, institutions, accounts, etc. Institutions can use these verifiable digital identities to provide security in linking user accounts.

For example, an issuer institution having information about a particular user may issue a VC to a first user claiming a relationship between the first user and a second user. The issuer institution may then generate and assign one or more DIDs to the first user to identify the user and the related VC. The DIDs can be written to a blockchain network, accessible to numerous other institutions. Later, the first user may initiate a request to link their user account at a verifier institution to the user account of the second user. The verifier institution may obtain the VC from the first user and the DIDs from the blockchain network and use the DIDs and related VC to verify that a relationship exists between the first user and the second user. In this manner, the verifier institution can trust that the relationship between the first user and the second user is valid and link the first user account and the second user account with a reduced fraud risk.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
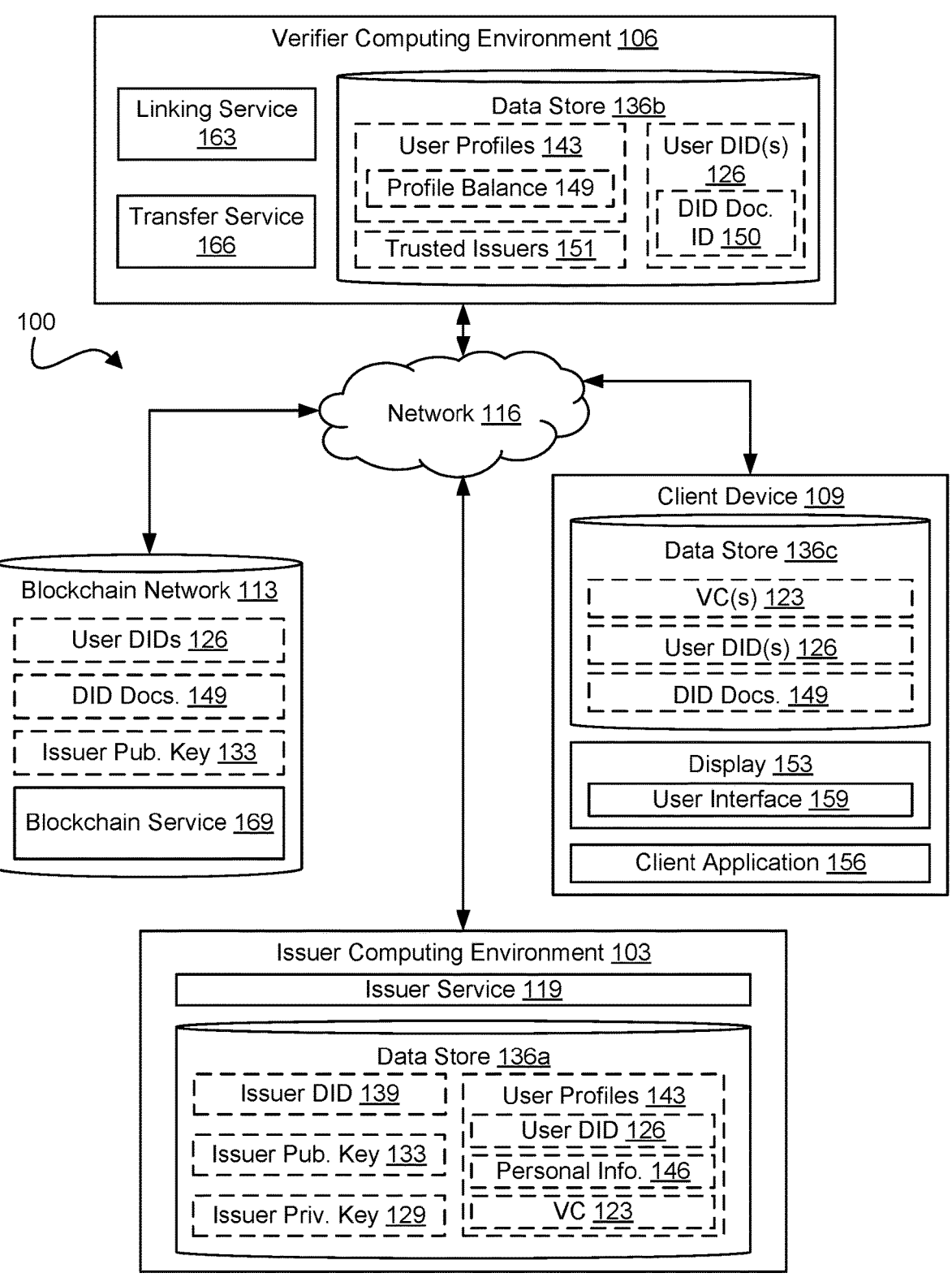
FIG. 1 is a drawing of a network environment according to various embodiments of the present disclosure.

With reference to FIG. 1, shown is a network environment 100 according to various embodiments. The network environment 100 can include an issuer computing environment 103, a verifier computing environment 106, a client device 109, and a blockchain network 113, which can be in data communication with each other via a network 116.

The network 116 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 116 can also include a combination of two or more networks 116. Examples of networks 116 can include the Internet, intranets, extranets, virtual private networks (VPNs), and similar networks.

The issuer computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the issuer computing environment 103 can employ a plurality of computing devices that can be arranged in one or more server banks or computer banks or other arrangements. Such computing devices can be located in a single installation or can be distributed among many different geographical locations. For example, the issuer computing environment 103 can include a plurality of computing devices that together can include a hosted computing resource, a grid computing resource, or any other distributed computing arrangement. In some cases, the issuer computing environment 103 can correspond to an elastic computing resource where the allotted capacity of processing, network, storage, or other computing-related resources can vary over time.

Various applications or other functionality can be executed in the issuer computing environment 103. The components executed on the issuer computing environment 103 include an issuer service 119, and other applications, services, processes, systems, engines, or functionality not discussed in detail herein.

The issuer service 119 can be executed to respond to requests to issue verifiable credentials 123. For example, an issuer service 119 can receive a request to issue a verifiable credential 123 from a client device 109. The request can include a specific decentralized identifier (DID) for the verifiable credential 123 to be associated with and/or information identifying the user or individual associated with the user DID 126. The issuer service 119 can then issue a verifiable credential 123 in response, which can be signed by the issuer private key 129 to allow third parties to determine the authenticity of the verifiable credential 123.

Also, various data is stored in a data store 136a that is accessible to the issuer computing environment 103. The data store 136a can be representative of a plurality of data stores 136a, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 136a is associated with the operation of the various applications or functional entities described below. This data can include an issuer DID 139, issuer public key 133, issuer private key 129, user profiles 143, and potentially other data.

An issuer decentralized identifier (issuer DID) 139 can correspond to an identifier than enables a verifiable, decentralized digital identity for an issuer. For example, the issuer DID 139 can be representative of a unique identifier for an issuer device or issuer service 119. The issuer DID 139 can serve as a fingerprint of an issuer public key 133. In some embodiments, the issuer DID 139 can be implemented using various standards, such as a version of the World Wide Web Consortium's (W3C's) Decentralized Identifier (DID) standard.

The issuer public key 133 and the issuer private key 129 can be parts of a public-private or asymmetric cryptographic key-pair used by the issuer service 119 when issuing verifiable credentials 123. The issuer private key 129 can be used to sign any verifiable credentials 123 issued, allowing third parties to determine the authenticity of the verifiable credential 123. The issuer public key 133 can be provided to any third party that requested the issuer public key 133 in order to verify that a verifiable credential 123 signed by the issuer private key 129 is genuine. The issuer public key 133, or a fingerprint of the issuer public key 133 can also be used to uniquely identify an issuer device or issuer service 119 with respect to other issuer devices or issuer services 119.

User profiles 143 can represent user data stored in association other usages of an issuer computing environment 103. For example, if the one or more issuer computing environments 103 is a government institution, then the user profile 143 can include user data in relation to a user's government identity (e.g., birth certificate, driver's license, passport, Social Security Number, etc.) and corresponding records. In at least some embodiments, the user profiles 143 can include user DIDs 126, VCs 123, profile balances 144 and personal information 146.

The user DIDs 126 can correspond to an identifier that enables verifiable, decentralized digital identity of a specific account and/or a specific subject (e.g., person, organization, thing, etc.). In some examples, the user DID 126 can be used to represent the identity of a user, a client device 109, and/or other suitable subjects. In various examples, a user DID 126 can include an address to a DID document 149. The DID document 149 associated with the user DID 126 can include information associated with the subject (e.g., a user, a client device 109, etc.). The DID document 149 associated with the user DID 126 can be hosted on any computing environment, such as the issuer computing environment 103, the client device 109, or any other computing environment, or any other distributed ledger, such as the blockchain network 113. In some embodiments, the DID document 149 associated with the user DID 126 can be shared peer-to-peer, rather than being shared from a centralized location. In various examples, the user DID 126 can be implemented using various standards, such as a version of the World Wide Web Consortium's (W3C's) Decentralized Identifier (DID) standard.

The verifiable credentials (VCs) 123 can represent digital credentials that have been issued by an issuer, such as the issuer computing environment 103. A VC 123 can include one or more claims about a subject, as represented by a DID, for which an issuer can attest. A VC 123 can represent all the same information that a physical credential represents. The addition of technologies, such as digital signatures, makes VCs 123 more tamper-evident and more trustworthy than their physical counterparts. In at least one embodiment, an issuer computing environment 103 can issue a VC 123 that includes a relationship (e.g., familial, professional, etc.) to another user profile 143 maintained by the issuer computing environment 103. A VC 123 can be used to derive verifiable presentations, which are tamper-evident presentations encoded in such a way that the source of the data can be trusted after a process of verification. The verifiable presentations are synthesized in such a way that the VC 123 cannot be recreated from the verifiable presentation alone. Verifiable credentials 123 and verifiable presentations can be implemented using various standards, such as a version of the World Wide Web Consortium's (W3C's) verifiable credentials (VC) data model standard.

The personal information 146 can represent various types of information about a user held in the issuer data store 136a. The personal information 146 can represent personal data associated with a user, such as name, address, contact information, identification information (e.g., birth certificate, driver's license, passport, Social Security Number, etc.), public healthcare information, state-held records (e.g., criminal records, property records, public financial records, etc.), and other suitable user data. The personal information 146 can be used to identify a person or an entity associated with a user DID 126.

The verifier computing environment 106 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the verifier computing environment 106 can employ a plurality of computing devices that can be arranged in one or more server banks or computer banks or other arrangements. Such computing devices can be located in a single installation or can be distributed among many different geographical locations. For example, the verifier computing environment 106 can include a plurality of computing devices that together can include a hosted computing resource, a grid computing resource, or any other distributed computing arrangement. In some cases, the verifier computing environment 106 can correspond to an elastic computing resource where the allotted capacity of processing, network, storage, or other computing-related resources can vary over time.

Various applications or other functionality can be executed in the verifier computing environment 106. The components executed on the verifier computing environment 106 include a linking service 163, a transfer service 166, and other applications, services, processes, systems, engines, or functionality not discussed in detail herein.

The linking service 163 can be configured to link one user profile 143 to another user profile 143. The linking service 163 can receive a request to link a first user profile 143 with a second user profile 143, the request including at least a first user DID 126 associated with the first user profile 143 and a second user DID 126 associated with the second user profile. Next, the linking service 163 can obtain a VC 123 claiming a relationship between the first user DID 126 and the second user DID 126. To obtain the VC 123, the linking service 163 can establish a secure communications channel with a client device associated with the first user profile, request the VC 123 through the channel, and receive the VC 123 through the channel. Then, the linking service 163 can verify the relationship between the first user DID 126 and the second user DID 126 based at least in part on the VC 123. In some embodiments, the linking service 163 can obtain consent from a client device 109 associated with the second user profile. Additionally, the linking service 163 can be executed to obtain first user data associated with the first user profile 143 and obtain second user data associated with the second user profile 143. In such examples, the linking service 163 can verify the relationship between the first user DID 126 and the second user DID 126 based at least in part on an evaluation of the first user data and the second user data. Finally, the linking service 163 can link the first user profile 143 and the second user profile 143.

The transfer service 166 can be configured to generate a linked profile balance and manage transfers of some or all of the linked profile balance. For example, the transfer service 166 can be executed to first determine a first profile balance 144 associated with the first user profile and determine a second profile balance 144 associated with the second user profile. Next, the transfer service 166 can generate a linked profile balance comprising the first profile balance 144 and the second profile balance 144. The transfer service 166 can receive, from a first client device 109a associated with the first user profile 143, a request to transfer a portion of the linked profile balance. In some embodiments, the transfer service 166 can receive an allocation instruction along with the request to transfer, where the allocation instruction can include a first portion of the transfer amount to be obtained from the first profile balance 144 and a second portion of the transfer amount to be obtained from the second profile balance 144. Next, the transfer service 166 can obtain, from a second client device 109b associated with the second user profile, approval to transfer the portion of the linked profile balance. Once approval has been obtained, the transfer service 166 can transfer the portion of the linked profile balance.

Also, various data is stored in a data store 136b that is accessible to the verifier computing environment 106. The data store 136b can be representative of a plurality of data stores 136b, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 136b is associated with the operation of the various applications or functional entities described below. This data can include user DIDs 126, user profiles 143, DID document identifiers (IDs) 150, trusted issuers 151, and potentially other data.

DID document IDs 150 can be included in a user DID 126. A DID document ID 150 can include any identifier that uniquely identifies a DID document 149 with respect to another DID document 149.

The trusted issuers 151 can represent a list of one or more issuer computing environments 103, issuer devices, or issuer services 119 that are trusted by the verifier. For example, applications or services in a verifier computing environment 106 can be configured to only trust verifiable credentials 123 issued by particular issuers who are known to be trustworthy to the verifier. For example, a trusted issuer of verifiable credentials 123 might be trusted to determine the veracity of any information included in a verifiable credential 123 that it issues. Therefore, the applications or services in a verifier computing environment 106 can be configured to only or preferentially rely on verifiable credentials 123 issued by issuer computing environments 103, issuer devices or issuer services 119 listed in the trusted issuers 151.

Issuer computing environments 103, issuer devices, or issuer services 119 can be identified among the trusted issuers 151 in a variety of manners. For example, the issuer public key 133, or a fingerprint of the issuer public key 133, associated with an issuer service 119, issuer computing environment 103, or issuer device can be used as an identifier for a trusted issuer 151. As another example, a unique identifier for the operator of the issuer device, issuer computing environment 103, or issuer service 119 can be used as an identifier for a trusted issuer 151. An example of such a unique identifier would be an issuer DID 139 or a fingerprint of an issuer public key 133.

The client device 109 is representative of a plurality of client devices that can be coupled to the network 116. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 can include one or more displays 153, such as liquid crystal displays (LCDs), gas plasma-based flat panel displays, organic light emitting diode (OLED) displays, electrophoretic ink ("E-ink") displays, projectors, or other types of display devices. In some instances, the display 153 can be a component of the client device 109 or can be connected to the client device 109 through a wired or wireless connection.

The client device 109 can be configured to execute various applications such as a client application 156 or other applications. The client application 156 can be executed in a client device 109 to access network content served up by the issuer computing environment 103, the verifier computing environment 106, or other servers, thereby rendering a user interface 159 on the display 153. To this end, the client application 156 can include a browser, a dedicated application, or other executable, and the user interface 159 can include a network page, an application screen, or other user mechanism for obtaining user input. The client device 109 can be configured to execute applications beyond the client application 156 such as email applications, social networking applications, word processors, spreadsheets, or other applications.

In addition, various data is stored in a data store 136c that is accessible to the client device 109. The data store 136c can be representative of a plurality of data stores 136c, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 136c is associated with the operation of the various applications or functional entities described below. This data can include VCs 123, user DIDs 126, DID document 149, and potentially other data.

As described above, DID documents 149 can be associated with the user DID 126 can include information associated with the subject (e.g., a user, a client device 109, etc.). The DID document 149 associated with the user DID 126 can be hosted on any computing environment, such as the issuer computing environment 103, the client device 109, or any other computing environment, or any other distributed ledger, such as the blockchain network 113. In some embodiments, the DID document 149 associated with the user DID 126 can be shared peer-to-peer, rather than being shared from a centralized location.

The blockchain network 113 can represent an immutable, append only, eventually consistent distributed data store formed from a plurality of nodes in a peer-to-peer network that maintain duplicate copies of data stored in the blockchain network 113. The nodes of the blockchain network 113 can use a variety of consensus protocols to coordinate the writing of data written to the blockchain network 113. In order to store or retrieve data to/from the blockchain network 113, a blockchain service 169 can be used.

Individual nodes of the blockchain network 113 can host a blockchain service 169. The blockchain service 169 can be configured to receive requests from other computing devices (e.g., from the issuer computing environment 103, the verifier computing environment 106, various client devices 109, etc.) and respond to the requests. For example, the blockchain service 169 can receive a request from a computing device to write data to the blockchain network 113. In response, the blockchain service 169 can write the data to the blockchain network 113 and verify that other nodes of the blockchain network 113 also wrote the data to the blockchain network 113. As another example, the blockchain service 169 can receive a request from a computing device to read data from the blockchain network 113. In response, the blockchain service 169 can search the blockchain network 113 and return the requested information from the blockchain network 113. Other operations can also be performed by the blockchain service 169 in various embodiments of the present disclosure.

Blockchain networks may be public or private. A public blockchain network is a blockchain network 113 that is accessible and available to anyone who operates a node, client, or other application configured to connect to or participate in the public blockchain network. A private blockchain network, sometimes referred to as a permissioned blockchain network, is a blockchain network 113 where participation is limited to authorized or permitted participants. A private blockchain network can be used in situations where the advantages of an immutable, append only, eventually consistent distributed data stores formed from a plurality of nodes in a peer-to-peer network that maintain duplicate copies of data is desired, but public or unrestricted access to the data is not desired. Examples of public blockchain network include the BITCOIN network, the ETHEREUM network, the SOLANA network, etc. Examples of a private blockchain network include sidechains to the BITCOIN network or ETHEREUM network, as well as HYPERLEDGER or similar systems. In some embodiments, the blockchain network 113 is a private blockchain network accessible only to the issuer and the verifier.

The blockchain network 113 can include user DID(s) 126d, DID document(s) 149, one or more public keys, including the issuer public key 133, and other suitable data. In various examples, a user DID 126d can correspond to an address to a DID document 149 that includes information associated with a subject (e.g., user, transaction, device, etc.). For example, the DID document 149 can include a set of data describing the subject and can include various information (e.g., cryptographic keys) that can be used to authenticate the subject. In at least one example, the DID document 149 can include various public keys, such as the issuer public key 133. In various examples, the user DID 126d and the DID document 149 can be implemented using various standards, such as the World Wide Web Consortium's (W3C's) Decentralized Identifier (DID) standard.

Next, a general description of the operation of the various components of the network environment 100 is provided. To begin, an issuer can issue a verified credential 123 to a first user, where the VC 123 represents a claim of a relationship existing between the first user and a second user. The first user can then send a request to a verifier to link a user profile 143 held by the first user with the verifier to a user profile 143 held by the second user with the verifier. A linking service 163 hosted by the verifier computing environment 106 can request proof of the relationship between the first user and the second user prior to linking the user profiles 143. As proof of the relationship, the first user can provide the VC 123 to the linking service 163. After receiving the VC 123, the linking service 163 can verify the VC 123 and the claimed relationship. Additionally, the linking service 163 can obtain data from the first user's profile 143 and data from the second user's profile 143 and cross-verify the relationship between the first user and the second user based at least in part on the obtained data. Once the relationship has been verified, the linking service 163 can obtain consent from the second user before linking the first user's profile 143 to the second user's profile 143. If no consent is obtained, the user profiles 143 will not be linked.

If verification is completed successfully and the user profiles 143 are linked, a transfer service 166 hosted by the verifier computing environment 106 can determine balances associated with the user profiles 143 of the first and second users respectively and generate a linked balance. Either the first user or the second user can initiate a transfer request to transfer at least a portion of the linked balance. The transfer service 166, after receiving the transfer request, can additionally obtain an allocation instruction from the initiating user which specifies how much of the total transfer amount should be allocated to each of the first user profile balance 144 and the second user profile balance 144 which together comprise the linked balance 144. The transfer service 166 can request approval from the non-initiating user to transfer the portion of the balance according to the allocation instruction. Once approval has been obtained, the transfer service 166 can transfer the portion of the balance.

Figure 2:
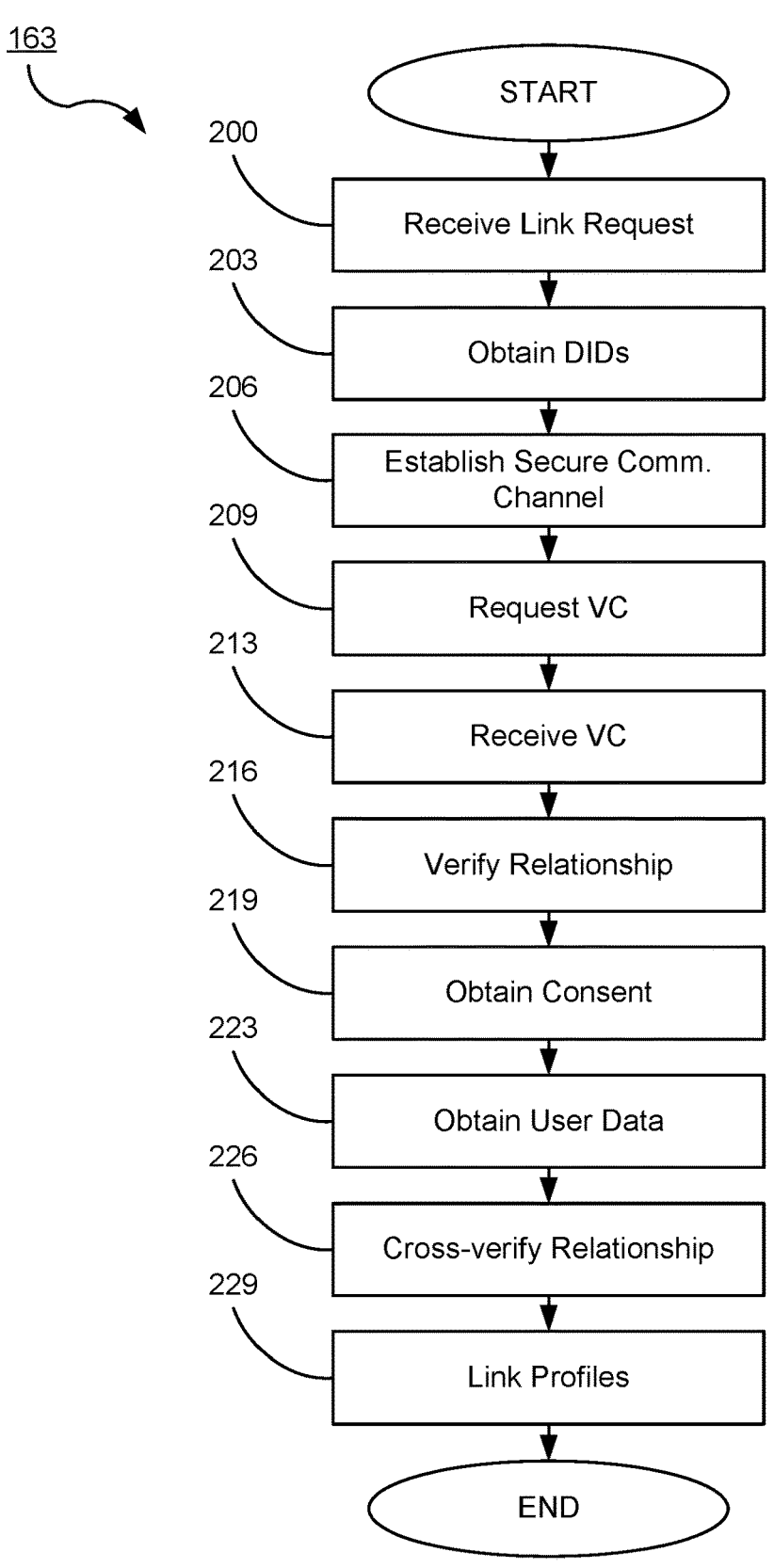
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the linking service 163. The flowchart of FIG. 2 provides merely an example of the many different types of functional arrangements that can be employed to implement the operation of the depicted portion of the linking service 163. As an alternative, the flowchart of FIG. 2 can be viewed as depicting an example of elements of a method implemented within the network environment 100.

Beginning with block 200, the linking service 163 can be executed to receive a link request. The link request can be representative of a message, instruction, or prompt to the linking service 163 to begin the process of verifying a relationship between two or more user profiles 143 and generate a link or connection between the user profiles 143. The link request can include one or more user DIDs 126 or other identifiers to reference the respective users and user profiles 143 to be linked. In some embodiments, the linking service 163 can receive the link request from a client application 156 on a client device 109 associated with a user. According to various embodiments, the link request can be initiated via a user interaction with a user interface 159 on a client device 109.

Next, at block 203, the linking service 163 can be executed to obtain one or more user DIDs 126. The user DIDs 126 can represent a first user DID 126 associated with the first user profile 143 and a second user DID 126 associated with the second user profile 143. In embodiments where more than two user profiles 143 were identified in the link request received at block 200, the linking service 163 can obtain at least one user DID 126 corresponding to each of the identified user profiles 143. In some embodiments, the linking service 163 can obtain the user DIDs 126 from a data store 136*b* in the verifier computing environment 106, from a client application 156 of a client device 109, from a blockchain network 113, or from another system, service, or application of the network environment 100.

At block 206, the linking service 163 can be executed to establish a secure communications channel with a client application 156. In some embodiments, the linking service 163 can be executed to make a request to establish a DIDcomm connection with a client application 156. The linking service 163 can send a connection message or request to the client application 156. In response, the client application 156 can display a prompt, or cause a browser to display a prompt to obtain the approval of the user to establish the connection between the client application 156 and the linking service 163. The client application 156 can be executed to accept the secure communications channel (e.g., DIDcomm) connection request. For example, the user can approve the connection request using a prompt shown by the client application 156 or a browser. Other approaches for accepting or approving a DIDcomm connection between the linking service 163 and the client application 156 can be implemented according to various embodiments of the present disclosure. The client application 156 and the linking service 163 can establish a DIDcomm connection in response to the user approving or consenting to the connection using the client application 156. This can be accomplished according to the specification of any version of the DIDcomm protocol as published by the Decentralized Identity Foundation (DIF). For example, the client application 156 and the linking service 163 can send a series of invitations and acceptances back and forth to establish the DIDcomm connection. The client application 156 and the linking service 163 can exchange key pieces of information, such as an endpoint where messages can be delivered to a respective service and public keys which can be used for encrypting messages exchanged over the DIDcomm connection.

At block 209, the linking service 163 can be executed to request a verifiable credential 123. This can be done using one or more of several approaches. In a first approach, the linking service 163 can send a request for a verifiable credential 123 to a client application 156 via the DIDcomm connection. This request can cause the client application 156 to prompt the user to select a verifiable credential 123 from one or more verifiable credentials 123 stored on the client device 109 of the user. In a second approach, the linking service 163 can request a specific verifiable credential 123. This can be done, for example, by identifying the issuing entity of a specific verifiable credential 123. For instance, if the linking service 163 and the issuer service 119 were operated by the same entity, the linking service 163 can provide the issuer DID 139 of the issuer service 119 or issuer public key 133 of the issuer service 119 to the client application 156 as a mechanism for selecting a verifiable credential 123 that had been previously issued by the operator of the linking service 163. This would allow the client application 156 to select a verifiable credential 123 issued by the issuer service 119 identified by the issuer DID 139 or issuer public key 133. In a similar example, the linking service 163 can provide a set of issuer DIDs 139 or a set of issuer public keys 133 included in the list of trusted issuers 151. This would act as a request for any verifiable credential 123 that had been issued by an issuer service 119 that was trusted by the linking service 163.

Moving to block 213, the linking service 163 can be executed to receive the verifiable credential 123. In some embodiments, the verifiable credential 123 can be received from the client application 156 after the user has selected a verifiable credential 123 from one or more verifiable credentials 123 stored on the client device 109 of the user. As another example, the linking service 163 can receive the verifiable credential 123 once the user has reviewed one or more verifiable credentials 123 identified in the request sent at block 209 and selected which verifiable credential(s) 123 to share with the linking service 163. The verifiable credential 123 can be received in response to the request for a verifiable credential 123 sent at block 209. In some embodiments, the linking service 163 can receive the verifiable credential 123 over the secure communication channel established at block 206.

Next, at block 216, the linking service 163 can be executed to verify a relationship between the users associated with the user profiles 143 identified in the link request received at block 200. The linking service 163 can cryptographically verify the integrity and/or authenticity of the relationship between users claimed by the verifiable credential 123. In some embodiments, the linking service 163 can determine whether the issuer DID 139 associated with the issuer service 119 of the verifiable credential 123 is among the trusted issuers 151 for the linking service 163. By verifying that the verifiable credential 123 was issued by a trusted issuer 151, the linking service 163 can determine that the relationship between users claimed in the verifiable credential 123 is trusted. As another example, the linking service 163 could determine whether the signature for the verifiable credential 123 is valid, indicating that the verifiable credential 123 was issued by the issuer service 119 and that the verifiable credential 123 has not been altered or otherwise tampered with.

At block 219, the linking service 163 can be executed to obtain consent from the one or more users who were identified in the link request received at block 200. Once the relationship has been verified at block 216, the linking service 163 can obtain consent to link the user profiles 143. In some embodiments, the linking service 163 obtains consent from the user(s) by sending a consent request to a client application 156 of a client device 109 associated with the user. The consent request can contain information about the user who initiated the link request, as well as information about the user profiles 143 identified in the link request, whether the verifiable credential 123 has been verified, and potentially other information. The linking service 163 can receive consent from the client application 156 in response to sending the consent request. In some embodiments, a user can interact with a user interface 159 to indicate their approval and consent to linking the user profiles 143.

At block 223, the linking service 163 can be executed to obtain user data. For example, if a first user profile 143 and a second user profile 143 are identified in the link request by a first user DID 126 and a second user DID 126 respectively, the linking service 163 can obtain the user data associated with the first user DID 126 and the user data associated with the second user DID 126. The user data can be representative of information included in user profiles 143 such as user DIDs 126, personal information 146, verifiable credentials 123, as well as potentially other data. In some embodiments, the user data can be obtained from a client application 156, a data store 136b in the verifier computing environment 106, or another system, service, or application in the network environment 100.

Next, at block 226, the linking service 163 can be executed to cross-verify the relationship identified in the link request received at block 200. In some embodiments, the linking service 163 can verify the relationship between the first user and the second user based at least in part on an evaluation of the user data. For example, after the linking service 163 has obtained the user data associated with the first user DID 126 and the user data associated with the second user DID 126, the linking service 163 can evaluate the first user data and the second user data to determine if the user data supports the existence of the claimed relationship. In some instances, the linking service 163 can identify and confirm relationships between users based at least in part on the user data.

Then, at block 229, the linking service 163 can be executed to link the user profiles 143. Once the relationship has been verified at block 216 and consent has been obtained at block 219, the linking service 163 can be executed to link the user profiles 143 identified in the link request of block 200. In some embodiments, the linking service 163 can link the user profiles 143 by generating a new linked profile which includes the user profiles 143 of each of the first user, the second user, and any other user identified in the link request of block 200. In some embodiments, the linking service 163 can grant each user of the linked profile at least partial access or control to the user profiles 143 of the other users of the linked profile. After block 229, the flowchart of FIG. 2 comes to an end.

Figure 3:
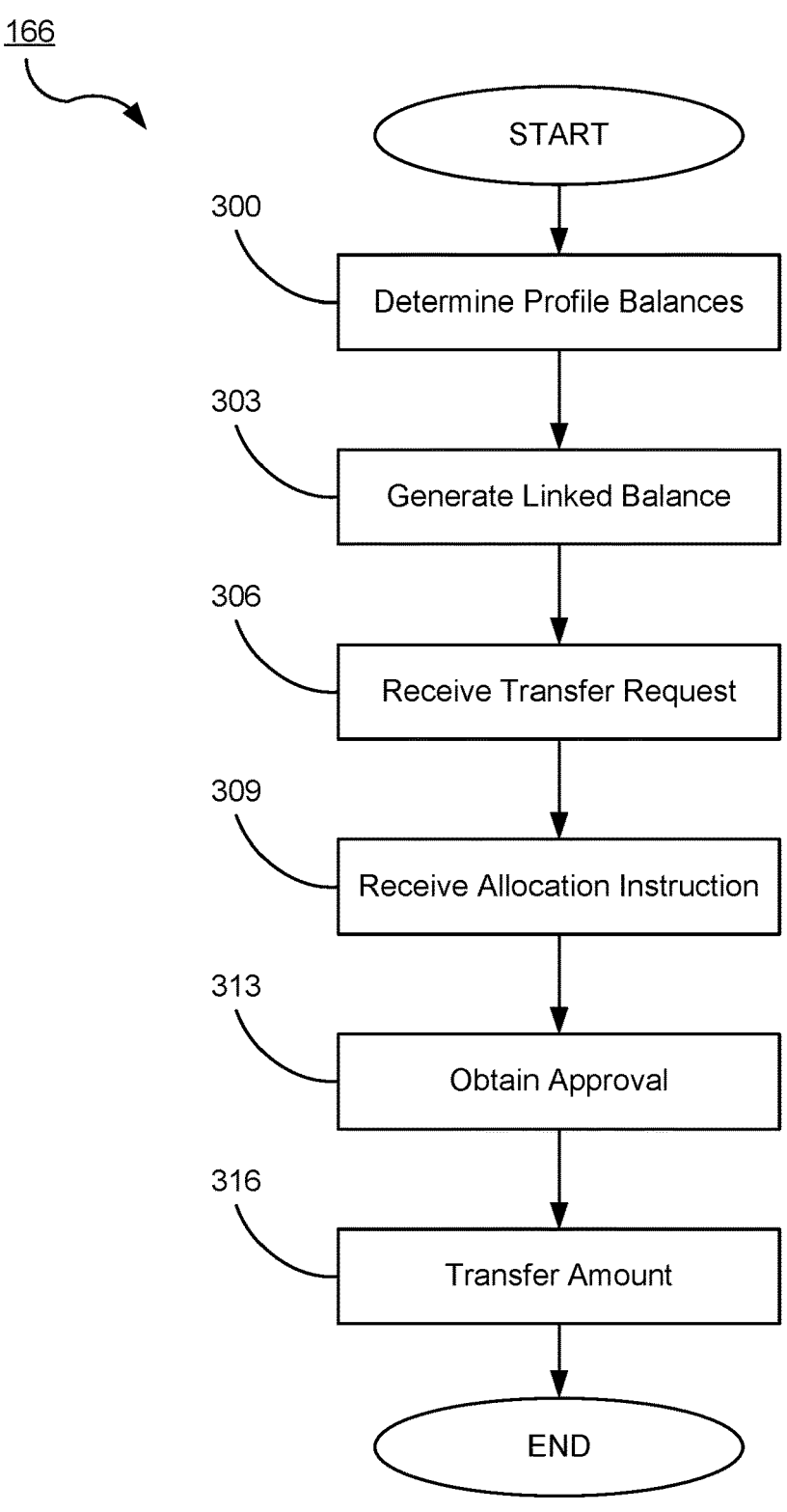
FIG. 3 is a flowchart illustrating one example of functionality implemented as portions of an application executed in a computing environment in the network environment of FIG. 1 according to various embodiments of the present disclosure.

Moving now to FIG. 3, shown is a flowchart that provides one example of the operation of a portion of the transfer service 166. The flowchart of FIG. 3 provides merely an example of the many different types of functional arrangements that can be employed to implement the operation of the depicted portion of the transfer service 166. As an alternative, the flowchart of FIG. 3 can be viewed as depicting an example of elements of a method implemented within the network environment 100.

Beginning with block 300, the transfer service 166 can be executed to determine profile balances 144 associated with each of the linked user profiles 143. For example, the transfer service 166 can obtain a linked profile, and identify a user profile 143 associated with each of the member users of the linked profile. The transfer service 166 can then determine a profile balance 144 associated with each user profile 143.

At block 303, the transfer service 166 can be executed to generate a linked profile balance. In some embodiments, the transfer service 166 can generate a linked profile balance based at least in part on the user profile balances 144 determined at block 300. The transfer service 166 can generate the linked profile balance by combining the total of each profile balance 144, or in some examples, generate the linked profile balance by combining portions of the profile balances 144 as consented to by users. For example, when a user consents to linking their user profile 143 as described in block 219 of FIG. 2, the user can designate at least a portion of their profile balance 144 to link to the other user profile 143. The transfer service 166 can use the designated portion of the profile balance 144 to generate the linked profile balance. In some embodiments, the linked balance is representative of a singular total value determined based at least in part on the combination of profile balances 144. In some embodiments, the linked balance is representative of each of the distinct profile balances 144.

At block 306, the transfer service 166 can be executed to receive a transfer request. The transfer request can be representative of a request, order, instruction, message, or other prompt to initiate a transfer of at least a portion of the linked profile balance. The transfer request can include destination information (e.g., a recipient user, institution, profile, etc.), a value for the amount to be transferred, a date and time for the transfer, as well as potentially other information. The transfer service 166 can receive the transfer request from a client application 156 on a client device 109 of any user associated with the linked profile balance.

Next, at block 309, the transfer service 166 can be executed to receive an allocation instruction. The allocation instruction can be representative of a request, order, instruction, message, or other prompt to allocate at least a portion of the transfer amount to be withdrawn from a particular profile balance 144 under the linked profile balance. For example, an allocation instruction can instruct the transfer service 166 to transfer a first amount from a first profile balance 144 under the linked profile balance and to transfer a second amount from a second profile balance 144 under the linked profile balance, the combination of the first amount and the second amount equaling the total transfer amount specified in the transfer request from block 306. In some embodiments, the transfer service 166 can receive the allocation instruction from a client application 156 of a client device 109.

At block 313, the transfer service 166 can be executed to obtain approval for the transfer request. In some embodiments, the transfer service 166 can send an approval request to the client application 156 of a non-initiating user and receive approval from the client application 156 in response. In some embodiments, the transfer service 166 can obtain approval from each of the users associated with the linked balance. When no approval is received, the transfer service 166 can end the transfer request and notify the user that the transfer request has been denied.

Finally, at block 316, the transfer service 166 can be executed to transfer the amount specified in the transfer request from block 306. The transfer service 166 can transfer the amount according to the details of the transfer request received at block 306 as well as the details of the allocation instruction received at block 309. In some embodiments, the transfer service 166 can send a notification to one or more client applications 156 after the amount has been successfully transferred. After block 316, the flowchart of FIG. 3 comes to an end.

Figure 4:
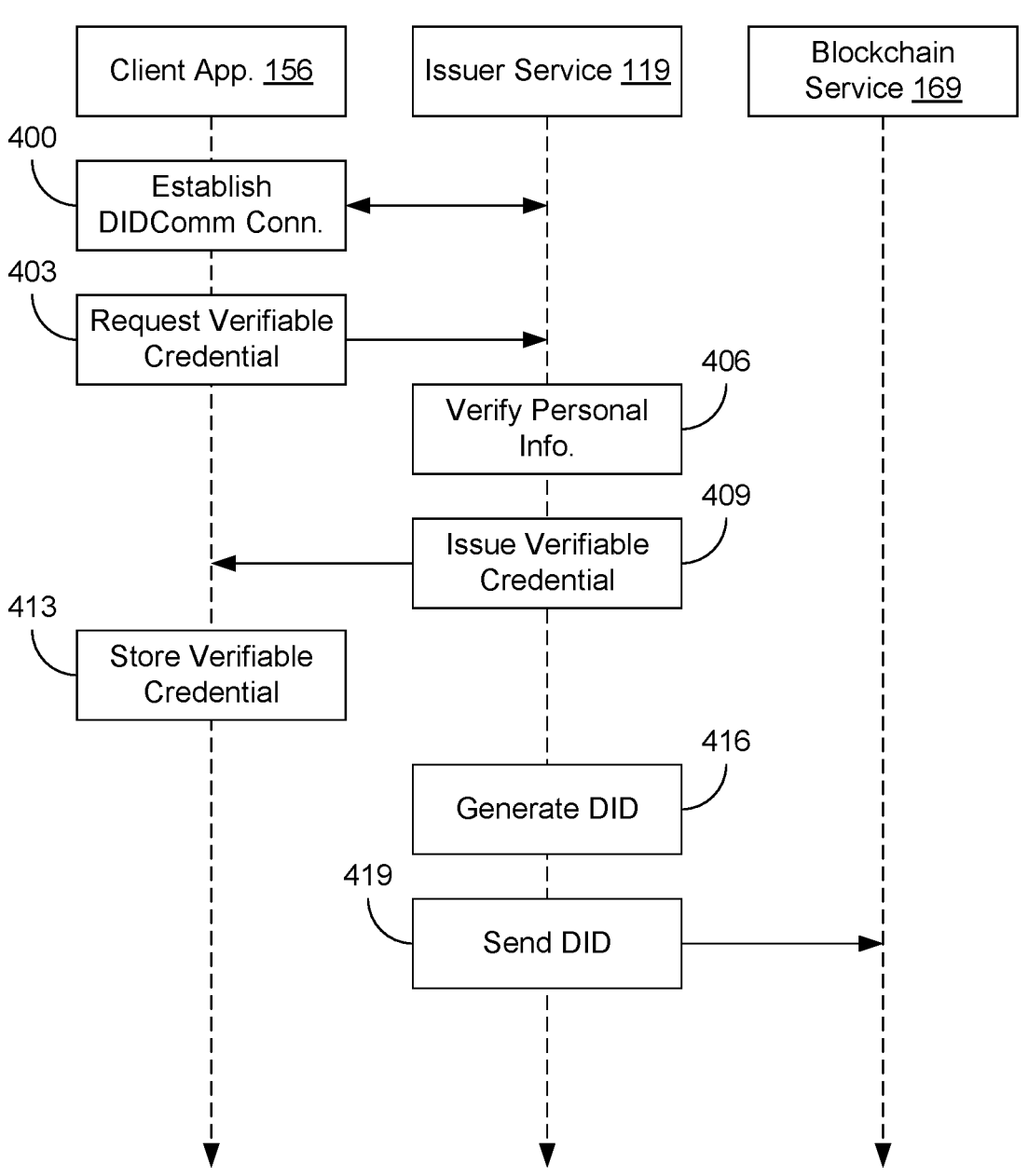
FIG. 4 is a sequence diagram illustrating interactions between various components of the network environment of FIG. 1 according to various embodiments of the present disclosure.

Referring next to FIG. 4, shown is a sequence diagram that provides one example of the interactions between the client application 156, the issuer service 119, and the blockchain service 169. The sequence diagram of FIG. 4 provides merely an example of the many different types of interactions between the client application 156, the issuer service 119, and the blockchain service 169. As an alternative, the sequence diagram of FIG. 4 can be viewed as depicting an example of elements of a method implemented within the network environment 100.

Beginning with block 400, the client application 156 can be executed to establish a secure connection, such as a DIDcomm connection, with the issuer service 119. As part of the connection process, the client application 156 can request or obtain the consent of the user to establish the DIDcomm connection with the issuer service 119 prior to establishing the connection. The DIDcomm connection can be accomplished or established according to the specification of any version of the DIDcomm protocol as published by the Decentralized Identity Foundation (DIF).

At block 403, the client application 156 can be executed to use the secure connection (e.g., the DIDcomm connection) established at block 400 to request a verifiable credential 123 from the issuer service 119. The request can include personal information 146 about a first user, a second user, or multiple users whose user profiles 143 are to be linked. In some implementations, the request can also include additional information about the user stored by or otherwise available to the client application 156 (e.g., information associated with user DIDs 126 or verifiable credentials 123 previously issued to the user). For example, if the client application 156 had a verifiable credential 123 issued by a government authority stored on the client device 109, the client application 156 can include information associated with the verifiable credential 123 issued by the government authority. As another example, if the client application 156 had a verifiable credential 123 issued by an employer institution stored on the client device 109, the client application 156 can include information associated with the verifiable credential 123 issued by the employer institution.

Moving to block 406, the issuer service 119 can be executed to verify personal information 146 about one or more users associated with the request of block 403. The personal information 146 can be included in the request sent from the client application 156 at block 403. In some embodiments, the personal information 146 can be verified by referencing user profiles 143 associated with the one or more users. For example, the issuer service 119 can receive the request for a verifiable credential 123 at block 403, search issuer-held data for user profiles 143 associated with the users identified in the request, and compare the personal information 146 provided in the request with personal information 146 included in the user profiles 143. In some embodiments, the issuer service 119 can cryptographically verify the integrity and/or authenticity of the personal information 146 provided by the client application 156. For example, the issuer service 119 can use a public key associated with the private key of the client application 156 to verify the signature created by the client application 156 using the private key of the client application 156. If the signature is correct, then the issuer service 119 can determine that the personal information 146 was provided by the client application 156 and also that the personal information 146 has not been tampered with.

At block 409, the issuer service 119 can be executed to create and issue a verifiable credential 123 for the relationship between the users and provide the verifiable credential 123 to the client application 156. The verifiable credential 123 can be created to comply with a form or format specified by a version of the W3C's "Verifiable Credentials Data Model." As part of the issuance process, the issuer service 119 can sign the verifiable credential 123 with the issuer private key 129 in order to allow third parties to confirm that the verifiable credential 123 was issued by the issuer service 119. The verifiable credential 123 can also include the issuer DID 139 associated with the issuer service 119, which can allow others to identify or otherwise determine which issuer service 119 issued an individual verifiable credential 123. The verifiable credential 123 can also include the user DID 126 of the individual or entity identified by the verifiable credential 123.

Then, at block 413, the client application 156 can be executed to store the verifiable credential 123 issued by the issuer service 119 on the client device 109. The client application 156 can, in some implementations, store the verifiable credential 123 in a secure storage area (e.g., provided by a secure enclave of the client device 109) or in an encrypted form in order to prevent unauthorized use of the verifiable credential 123. In some embodiments, the client application 156 can store the verifiable credential 123 in a data store 136c on the client device 109.

Next, at block 416, the issuer service 119 can be executed to generate a user DID 126. The user DID 126 can reference a DID document 149 which contains the verifiable credential 123. In some embodiments, the user DID 126 can be used to identify a relationship between one user and another user. The issuer service 119 can first generate a DID document 149 that includes various user data and personal information 146 from the request received at block 403, as well as other information, such as the identity of the client device 109 associated with the user, or information relating to another suitable subject. The DID document 149 can also include a user public key that is publicly accessible and associated with the user. The DID document 149 can be stored in the issuer computing environment 103, or other computing environment. Once the DID document 149 has been generated, the user DID 126 can be generated to reference the DID document 149 according to at least one of the World Wide Web Consortium's (W3C's) Decentralized Identifier (DID) standard or the Identity Foundation's peer DID standard.

At block 419, the issuer service 119 can be executed to send the user DID 126 to the blockchain service 169. In some embodiments, the issuer service 119 sends a write request to the blockchain service 169 to have the user DID 126 written to the blockchain network 113. According to various examples, the issuer service 119 can encrypt the user DID 126 before saving the user DID 126 to the blockchain network 113. After block 419, the sequence diagram of FIG. 4 comes to an end.

Figure 5:
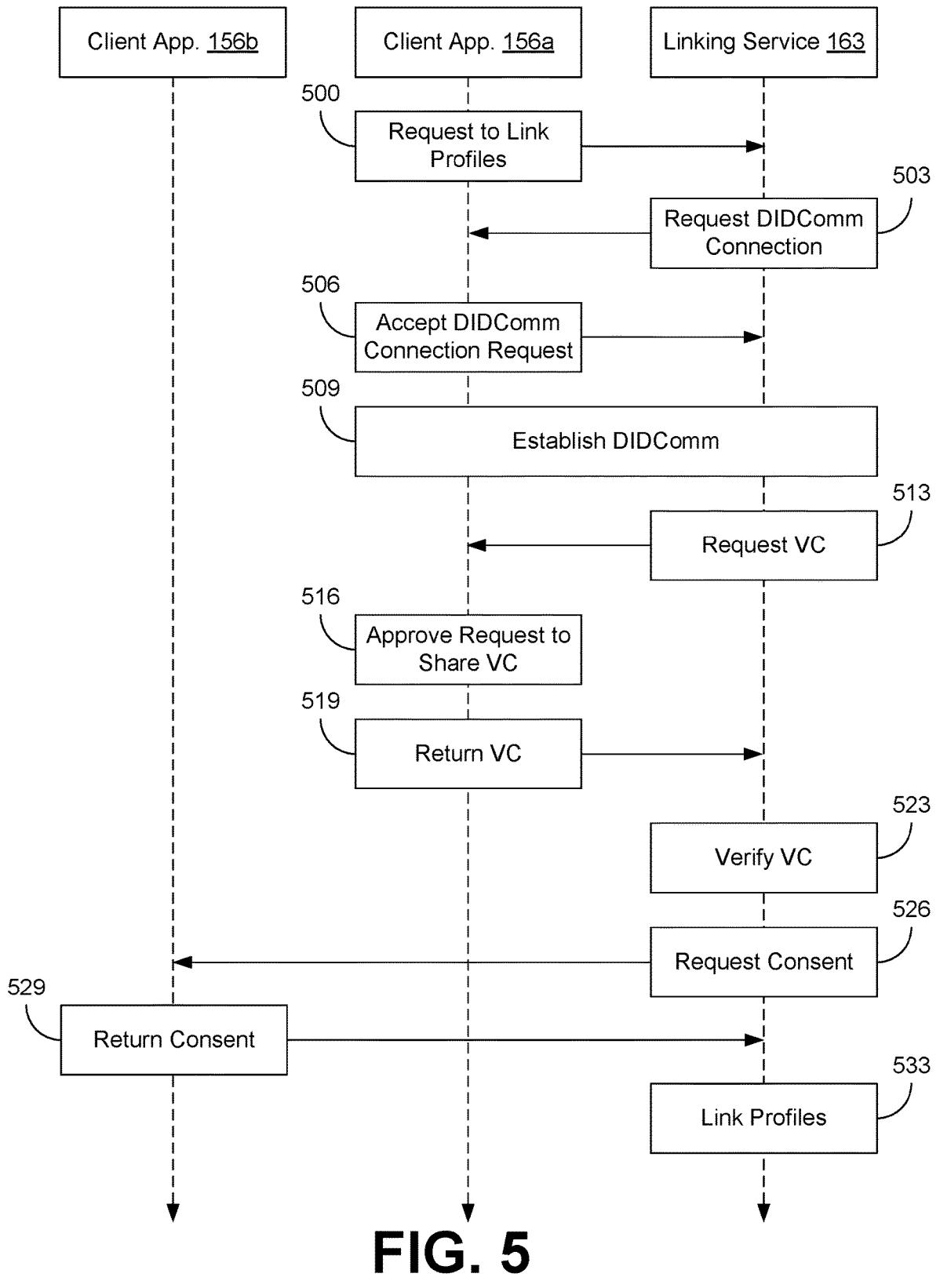
FIG. 5 is a sequence diagram illustrating interactions between various components of the network environment of FIG. 1 according to various embodiments of the present disclosure.

Moving now to FIG. 5, shown is a sequence diagram that provides one example of the interactions between a first client application 156a, a second client application 156b, and the linking service 163. The sequence diagram of FIG. 5 provides merely an example of the many different types of interactions between the first client application 156a, a second client application 156b, and the linking service 163. As an alternative, the sequence diagram of FIG. 5 can be viewed as depicting an example of elements of a method implemented within the network environment 100.

Beginning at block 500, the first client application 156a can be executed to send a request to link one or more user profiles 143. The request can be representative of a message, instruction, or prompt to the linking service 163 to begin the process of verifying a relationship between two or more user profiles 143 and generate a link or connection between the user profiles 143. The request can include one or more user DIDs 126 or other identifier to reference the user profiles 143 for the linking service 163 to link. In some embodiments, the linking service 163 can receive the request from a first client application 156a on a first client device 109 associated with a first user. According to various embodiments, the request can be initiated via a user interaction with a user interface 159 on a client device 109.

Next, at block 503, the linking service 163 can be executed to make a request to establish a secure connection, such as a DIDcomm connection, with the first client application 156a of the first user. The linking service 163 can send a connection message or request to the first client application 156a. In response, the first client application 156a can display a prompt, or cause a browser to display a prompt to obtain the approval of the user to establish the connection between the first client application 156a and the linking service 163.

At block 506, the first client application 156a can be executed to accept the secure connection (e.g., DIDcomm connection) request. For example, the user can approve the connection request using a prompt shown by the first client application 156a or a browser. Other approaches for accepting or approving a DIDcomm connection between the linking service 163 and the first client application 156a can be implemented according to various embodiments of the present disclosure.

At block 509, the first client application 156a and the linking service 163 can establish a secure connection (e.g., a DIDcomm connection) in response to the user approving or consenting to the connection using the first client application 156a at block 506. This can be accomplished according to the specification of any version of the DIDcomm protocol as published by the Decentralized Identity Foundation (DIF).

Next, at block 513, the linking service 163 can be executed to request a verifiable credential 123 from the first client application 156a. This can be done using one or more of several approaches, examples of which are described in greater detail in the discussion of block 209 in FIG. 2.

At block 516, the first client application 156a can be executed to approve the request to share a verifiable credential 123 with the linking service 163. For example, the user can select within the first client application 156a a specific verifiable credential 123 that the user wished to share with the linking service 163. As another example, the user can review one or more verifiable credentials 123 identified by the linking service 163 and select which verifiable credential(s) 123 to share with the linking service 163. Moreover, the user can select which questions are to be used for authentication and/or which answers he or she is willing to share with the linking service 163.

At block 519, the first client application 156a can be executed to return the verifiable credential(s) 123 selected and approved by the user. The first client application 156a can send the verifiable credential(s) 123 to the linking service 163 over a secured communication channel. The verifiable credential(s) 123 can be returned using the same secure connection (e.g., DIDcomm connection) that was established at block 509.

Moving to block 523, the linking service 163 can be executed to verify the verifiable credential 123 received from the first client application 156a at block 519. For example, the linking service 163 can determine whether the issuer DID 139 associated with the issuer service 119 of the verifiable credential 123 is among the trusted issuers 151 for the linking service 163. As another example, the linking service 163 can determine whether the signature for the verifiable credential 123 is valid, indicating that the verifiable credential 123 was issued by the issuer service 119 and that the verifiable credential 123 has not been altered or otherwise tampered with.

At block 526, the linking service 163 can be executed to request consent from a second client application 156b on a second client device 109 associated with the second user. The request for consent can include information about the request to link profiles received at block 500, as well as information about the first user, the verifier, the user profiles 143 to be linked, or other information which the second user may find helpful. In some embodiments, the request for consent is sent to the client application 156 of one or more users identified in the request to link profiles from block 500.

Next, at block 529, the second client application 156b can be executed to return consent by the second user. In some embodiments, the return of consent can be initiated via a user interaction with a user interface 159 on a client device 109 associated with the second user. The return of consent can be representative of an acknowledgment and approval for the linking service 163 to proceed with linking the user profiles 143 identified in the request for consent from block 526.

At block 533, the linking service 163 can be executed to link the user profiles 143. Once the relationship has been verified at block 523 and consent has been obtained at block 529, the linking service 163 can be executed to link the user profiles 143 identified in the link request of block 500. In some embodiments, the linking service 163 can link the user profiles 143 by generating a new linked profile which includes the user profiles 143 of each of the first user, the second user, and any other user identified in the link request of block 500. In some embodiments, the linking service 163 can grant each user of the linked profile at least partial access or control to the user profiles 143 of the other users of the linked profile. After block 533, the sequence diagram of FIG. 5 comes to an end.

A number of software components previously discussed are stored in the memory of the respective computing devices and are executable by the processor of the respective computing devices. In this respect, the term "executable"

means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive a request to link a first user profile with a second user profile, the request including at least a first user decentralized identifier (first user DID) associated with the first user profile and a second user decentralized identifier (second user DID) associated with the second user profile;
obtain, from a blockchain network, a verifiable credential (VC) issued by a trusted issuer, the VC claiming a relationship between the first user DID and the second user DID;
verify the relationship between the first user DID and the second user DID based at least in part on the VC;
obtain consent to link the first user profile and the second user profile from a client device associated with the second user profile; and
link the first user profile and the second user profile by causing the computing device to at least:
determine a first profile balance associated with the first user profile;
determine a second profile balance associated with the second user profile; and
generate a linked profile balance comprising the first profile balance and the second profile balance.

2. The system of claim 1, wherein client device is a second client device and the machine-readable instructions which, when executed, cause the computing device to obtain the VC further cause the computing device to at least:
establish a secure communications channel with a first client device associated with the first user profile;
request, through the secure communications channel, the VC; and
receive, through the secure communications channel, the VC.

3. The system of claim 1, wherein the machine-readable instructions further cause the computing device to at least:
obtain first user data associated with the first user profile;
obtain second user data associated with the second user profile; and
verify the relationship between the first user DID and the second user DID based at least in part on an evaluation of the first user data and the second user data.

4. The system of claim 1, wherein the client device is a second client device and the machine-readable instructions further cause the computing device to at least:
receive, from a first client device associated with the first user profile, a request to transfer a portion of the linked profile balance;
obtain, from the second client device associated with the second user profile, approval to transfer the portion of the linked profile balance; and
transfer the portion of the linked profile balance.

5. The system of claim 1, wherein the client device is a second client device and the machine-readable instructions further cause the computing device to at least:
receive, from a first client device associated with the first user profile, a request to transfer an amount from the linked profile balance, the request including at least a transfer amount;
receive, from the first client device, an allocation instruction to allocate a first portion of the transfer amount from the first profile balance and to allocate a second portion of the transfer amount from the second profile balance;
obtain, from the second client device associated with the second user profile, approval of the allocation instruction; and
transfer the amount based at least in part on the allocation instruction.

6. The system of claim 1, wherein the machine-readable instructions which, when executed, cause the computing device to verify the relationship between the first user DID and the second user DID based at least in part on the VC further cause the computing device to at least:
determine that an issuer decentralized identifier (issuer DID) associated with an issuer service of the VC is among a list of trusted issuers; and
determine that a digital signature for the VC was issued by the issuer service and has not been altered or otherwise tampered with.

7. A method, comprising:
receiving, by a computing device, a request to link a first user profile with a second user profile, the request including at least a first user decentralized identifier (first user DID) associated with the first user profile and a second user decentralized identifier (second user DID) associated with the second user profile;
obtaining, by the computing device and from a blockchain network, a verifiable credential (VC) issued by a trusted issuer, the VC claiming a relationship between the first user DID and the second user DID;
verifying, by the computing device, the relationship between the first user DID and the second user DID based at least in part on the VC;
obtaining consent to link the first user profile and the second user profile from a client device associated with the second user profile; and
linking, by the computing device, the first user profile and the second user profile by at least:
determining, by the computing device, a first profile balance associated with the first user profile;
determining, by the computing device, a second profile balance associated with the second user profile; and
generating, by the computing device, a linked profile balance comprising the first profile balance and the second profile balance.

8. The method of claim 7, wherein the client device is a second client device and obtaining the VC further comprises at least:

establishing, by the computing device, a secure communications channel with a first client device associated with the first user profile;

requesting, by the computing device through the secure communications channel, the VC; and receiving, by the computing device through the secure communications channel, the VC.

9. The method of claim 7, further comprising at least:

obtaining, by the computing device, first user data associated with the first user profile;

obtaining, by the computing device, second user data associated with the second user profile; and verifying, by the computing device, the relationship between the first user DID and the second user DID based at least in part on an evaluation of the first user data and the second user data.

10. The method of claim 7, wherein the client device is a second client device and the method further comprises at least:

receiving, from a first client device associated with the first user profile, a request to transfer a portion of the linked profile balance;

obtaining, from the second client device associated with the second user profile, approval to transfer the portion of the linked profile balance; and transferring, by the computing device, the portion of the linked profile balance.

11. The method of claim 7, wherein the client device is a second client device and the method further comprises at least:

receiving, from a first client device associated with the first user profile, a request to transfer an amount from the linked profile balance, the request including at least a transfer amount;

receiving, from the first client device, an allocation instruction to allocate a first portion of the transfer amount from the first profile balance and to allocate a second portion of the transfer amount from the second profile balance;

obtaining, from the second client device associated with the second user profile, approval of the allocation instruction; and transferring, by the computing device, the amount based at least in part on the allocation instruction.

12. The method of claim 7, wherein verifying the relationship between the first user DID and the second user DID based at least in part on the VC further comprises at least:

determining that an issuer decentralized identifier (issuer DID) associated with an issuer service of the VC is among a list of trusted issuers; and determining that a digital signature for the VC was issued by the issuer service and has not been altered or otherwise tampered with.

13. A non-transitory, computer-readable medium, comprising machine-readable instructions that, when executed by a processor of a computing device, cause the computing device to at least:

receive a request to link a first user profile with a second user profile, the request including at least a first user decentralized identifier (first user DID) associated with the first user profile and a second user decentralized identifier (second user DID) associated with the second user profile;

obtain, from a blockchain network, a verifiable credential (VC) issued by a trusted issuer, the VC claiming a relationship between the first user DID and the second user DID;

verify the relationship between the first user DID and the second user DID based at least in part on the VC;

obtain consent to link the first user profile and the second user profile from a client device associated with the second user profile; and generate a linked profile based at least in part on the first user profile and the second user profile by causing the computing device to at least:

determine a first profile balance associated with the first user profile;

determine a second profile balance associated with the second user profile; and generate a linked profile balance comprising the first profile balance and the second profile balance.

14. The non-transitory, computer-readable medium of claim 13, wherein the client device is a first client device and the machine-readable instructions which, when executed by the processor, cause the computing device to obtain the VC, further cause the computing device to at least:

establish a secure communications channel with a first client device associated with the first user profile;

request, through the secure communications channel, the VC; and receive, through the secure communications channel, the VC.

15. The non-transitory, computer-readable medium of claim 13, wherein the client device is a second client device and the machine-readable instructions, when executed by the processor, further cause the computing device to at least:

receive, from the first client device associated with the first user profile, a request to transfer a portion of the linked profile balance;

obtain, from the second client device associated with the second user profile, approval to transfer the portion of the linked profile balance; and transfer the portion of the linked profile balance.

16. The non-transitory, computer-readable medium of claim 13, wherein the client device is a second client device and the machine-readable instructions, when executed by the processor, further cause the computing device to at least:

receive, from the first client device associated with the first user profile, a request to transfer an amount from the linked profile balance, the request including at least a transfer amount;

receive, from the first client device, an allocation instruction to allocate a first portion of the transfer amount from the first profile balance and to allocate a second portion of the transfer amount from the second profile balance;

obtain, from the second client device associated with the second user profile, approval of the allocation instruction; and transfer the amount based at least in part on the allocation instruction.

17. The non-transitory, computer-readable medium of claim 13, wherein the machine-readable instructions further cause the computing device to at least:

obtain first user data associated with the first user profile;

obtain second user data associated with the second user profile; and verify the relationship between the first user DID and the second user DID based at least in part on an evaluation of the first user data and the second user data.

18. The non-transitory, computer-readable medium of claim 13, wherein the machine-readable instructions further cause the computing device to at least:

determine that an issuer decentralized identifier (issuer DID) associated with an issuer service of the VC is among a list of trusted issuers; and determine that a digital signature for the VC was issued by the issuer service and has not been altered or otherwise tampered with.

\* \* \* \* \*